United States Patent
Frechin et al.

(10) Patent No.: US 7,520,166 B2
(45) Date of Patent: Apr. 21, 2009

(54) METHOD FOR DETECTING HYDROCARBONS IN GEOLOGICAL STRATA

(75) Inventors: Nicolas Frechin, Paris (FR); Yves Kerbart, Gentily (FR)

(73) Assignee: Geoservices, Mesnil (FR)

( * ) Notice: Subject to any disclaimer, the term of this patent is extended or adjusted under 35 U.S.C. 154(b) by 171 days.

(21) Appl. No.: 10/574,566

(22) PCT Filed: Sep. 29, 2004

(86) PCT No.: PCT/FR2004/002471

§ 371 (c)(1),
(2), (4) Date: Oct. 10, 2006

(87) PCT Pub. No.: WO2005/035945

PCT Pub. Date: Apr. 21, 2005

(65) Prior Publication Data

US 2007/0062272 A1    Mar. 22, 2007

(30) Foreign Application Priority Data

Oct. 6, 2003    (FR)    ................................. 03 11688

(51) Int. Cl.
*G01F 15/08*    (2006.01)
(52) U.S. Cl. ...................................................... 73/200
(58) Field of Classification Search ............. 73/200, 73/152.54, 152.46, 152.55; 166/250.01, 166/252.1, 250.03
See application file for complete search history.

(56) References Cited

U.S. PATENT DOCUMENTS

| 2,938,117 A | 5/1960 | Schmidt | ..................... 250/255 |
| 4,765,182 A | 8/1988 | Boone | ..................... 73/152.04 |

OTHER PUBLICATIONS

B.O. Pixler: "Formation Evaluation by Analysis of Hydrocarbon Ratios" Society of Petroleum Engineers, vol. SPE, No. 2254, Sep. 29, 1968, pp. 665-670, XP002278943.

*Primary Examiner*—Hezron Williams
*Assistant Examiner*—Tamiko D Bellamy
(74) *Attorney, Agent, or Firm*—Wenderoth, Lind & Ponack, L.L.P.

(57) ABSTRACT

A method analyzes the hydrocarbon composition of geological strata. The method includes an analysis of gaseous hydrocarbon concentrations contained in drilling muds. According to the method, for a given depth range, gaseous hydrocarbon concentration ratios are established in pairs at essentially-identical depths. Subsequently, a sub-set of the ratios is selected in order to form a signature that is representative of the gaseous hydrocarbon composition of the depth range. The aforementioned signature is defined by the at least one straight line representing the concentration of a first gaseous hydrocarbon in relation to the concentration of a second hydrocarbon. The signature is then compared to reference signatures in order to determine the hydrocarbon concentration of the geological stratum corresponding to the depth range.

8 Claims, 3 Drawing Sheets

METHOD FOR DETECTING
HYDROCARBONS IN GEOLOGICAL STRATA

BACKGROUND OF THE INVENTION

1. Field of the Invention

The invention relates to methods for detecting hydrocarbons in geological strata and, more particularly, to detection methods which use the analysis of drilling muds.

2. Description of the Related Arts

A number of methods are currently used for detecting the composition of geological strata. In this manner, oil exploration uses analyses of rocks extracted by means of exploratory drilling operations, seismological analyses, et cetera.

For a number of years, studies have been carried out in order to demonstrate the advantage of analyzing the contents of hydrocarbon gases in drilling muds.

The oldest method was described by Pixler, B. O. in 1969 in "Formation Evaluation by Analysis of Hydrocarbon Ratios", (Journ. Pet. Tech., vol. 21, no 6) then supplemented by Ferrie in 1981 (Ferrie, G. H., Pixler, B. O., and Allen, S., "Wellsite Formation Evaluation by Analysis of Hydrocarbon Ratios", 83rd Ann. Meeting Ca. Soc. Min. & Met., 1981). It involves establishing the ratios between methane ($C_1$) and different gaseous hydrocarbons, such as ethane ($C_2$), propane ($C_3$) and butanes ($C_{4+}$). The potential features of the analyzed zone are established from these ratios. The applicant thus considers, in the earth analyses carried out up to the present time, that a $C_1/C_2$ ratio of between 15 and 65 indicates a zone which is rich in gas.

However, the method described by Pixler, and the variants thereof, do not allow a meaningful representation of a large volume of data.

Therefore, whilst still using the contents of light alkane in the drilling muds, other more complex ratios have been sought because they are more representative of the hydrocarbon contents of geological strata (Whittaker, M., Sellens, M., Analysis uses alkane ratios from chromatography, Oil & Gas Journal, May 18, 1987).

U.S. Pat. No. 2,938,117 belonging to K. H. Schmidt thus describes a method for analyzing the hydrocarbon contents of various wells by means of analysis of the composition of the gases of the wells.

This patent indicates that, by establishing a log-log graph of the ratio representing the ratio of two types of gaseous hydrocarbons in accordance with the gas/liquid ratio of the corresponding well, it is possible to represent the developments of this ratio between gases on a straight line. Provided with this chart, the detection of a value of a ratio between two gases extracted from a well thus allows the gas/liquid ratio of the well to be determined.

However, the unreliability of the measurements linked to the analysis system and the differences in the quality of the drilling mud leads to a level of unreliability or bias which makes the interpretation of these ratios difficult and subject to a number of errors.

SUMMARY OF THE INVENTION

The object of the present invention is therefore to reduce, or eliminate, the unreliability or bias of these measurements in order to provide an analysis which is more reliable, easier and finally meaningful.

This object is achieved by establishing that, for a specific homogeneous geological zone, the measurement points of the content of a first hydrocarbon $C_j$ for a given depth relative to the content of a second hydrocarbon $C_i$ for the same depth are positioned on a straight line, for all the pairs $C_j$, $C_i$.

More precisely, the object of the present invention is achieved by preparing a summary of the contents of a plurality of gaseous hydrocarbons of the muds, or effluents, produced by a well drilling system, at various depths. Then establishing, for each depth, a plurality of gaseous hydrocarbon ratios, in pairs, for at least one depth range. From this plurality of ratios, a sub-group of reference ratios is selected to constitute the signature which is representative of the gaseous hydrocarbon composition of the effluent in the at least one depth range. This signature is formed by at least one straight line which is taken from a group of straight lines, each straight line representing a ratio in the form of the content of a first gaseous hydrocarbon relative to the content of a second gaseous hydrocarbon.

This signature, which is characteristic of the geological stratum corresponding to the at least one depth range, is compared with signatures of reference strata in order to determine the characteristics thereof in terms of hydrocarbon content.

The object of the present invention is achieved by using an analysis system which comprises means for analysing the gaseous hydrocarbon content of the muds, or effluents, of a well drilling system and means for storing these contents in accordance with the drilling depth. Furthermore, this system comprises data processing and display means which allow a plurality of gaseous hydrocarbon content ratios at a substantially identical depth to be displayed in the form of a plurality of graphs, each graph representing the content of a first hydrocarbon in accordance with the content of a second hydrocarbon for at least one depth range. At least one of these graphs represents a signature of the geological stratum for the depth range. Each graph of the signature represents a straight line.

It is possible to superimpose the "graphic" signatures representing two or more geological strata for comparison.

The invention also relates to the numerical data structure recorded on a storage medium in order to be implemented by a computer, this data structure comprising numerical values of at least a pair of gaseous hydrocarbon contents. These numerical values are represented on a straight line corresponding to a depth range, this straight line being representative of the signature of a geological stratum.

DETAILED DESCRIPTION OF THE INVENTION

Figure 1:
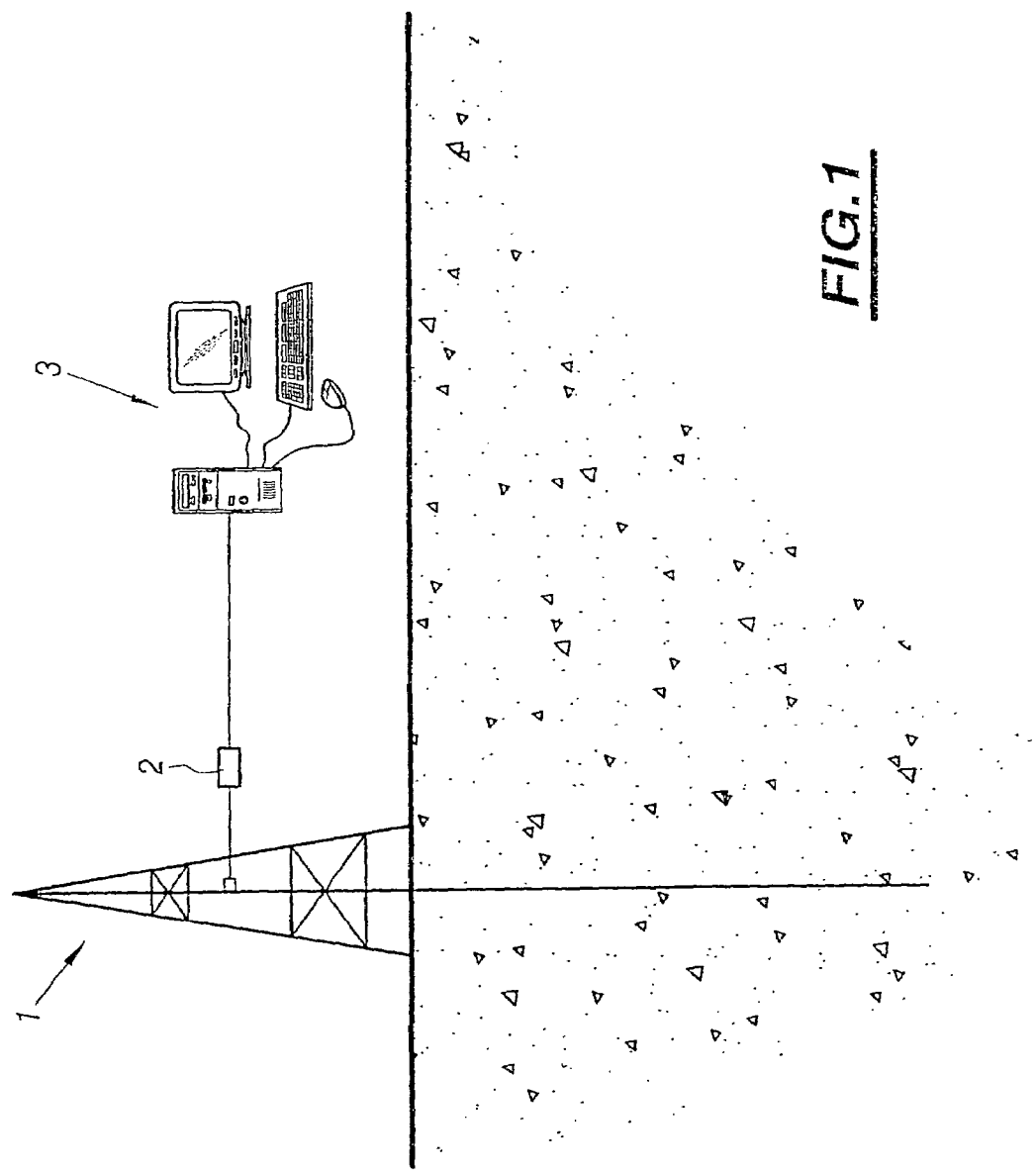
FIG. 1 illustrates a well drilling system to which a measurement and analysis chain is connected.

The invention uses the data produced by a measurement chain 2 installed beside a well drilling system 1 (FIG. 1).

This chain measures the gases, and in particular, the gaseous hydrocarbons, found in drilling muds.

This measurement is well known to a person skilled in the art since it has two objectives: a safety objective in order to indicate the correct operation of the cutters and to indicate zones containing hydrocarbons.

A measurement chain of this type comprises a "gas trap" for extracting the gas contained in the drilling mud, a system of pipes, pumps and filters for conveying the dry gas sample to the measuring device, and the measuring device itself.

At the present time, the measuring device used is most often a high-resolution rapid gas phase chromatograph associated with a flame ionisation detector or a mass spectrometer.

These devices allow detection thresholds of a few parts per million (ppm) to be achieved for a plurality of gases.

The data provided by this device are then stored with the depth value to which they correspond so as to be able to be analyzed by a data processing device 3 which can be a computer of the standard type which is capable of implementing a dedicated piece of software.

Figure 2:
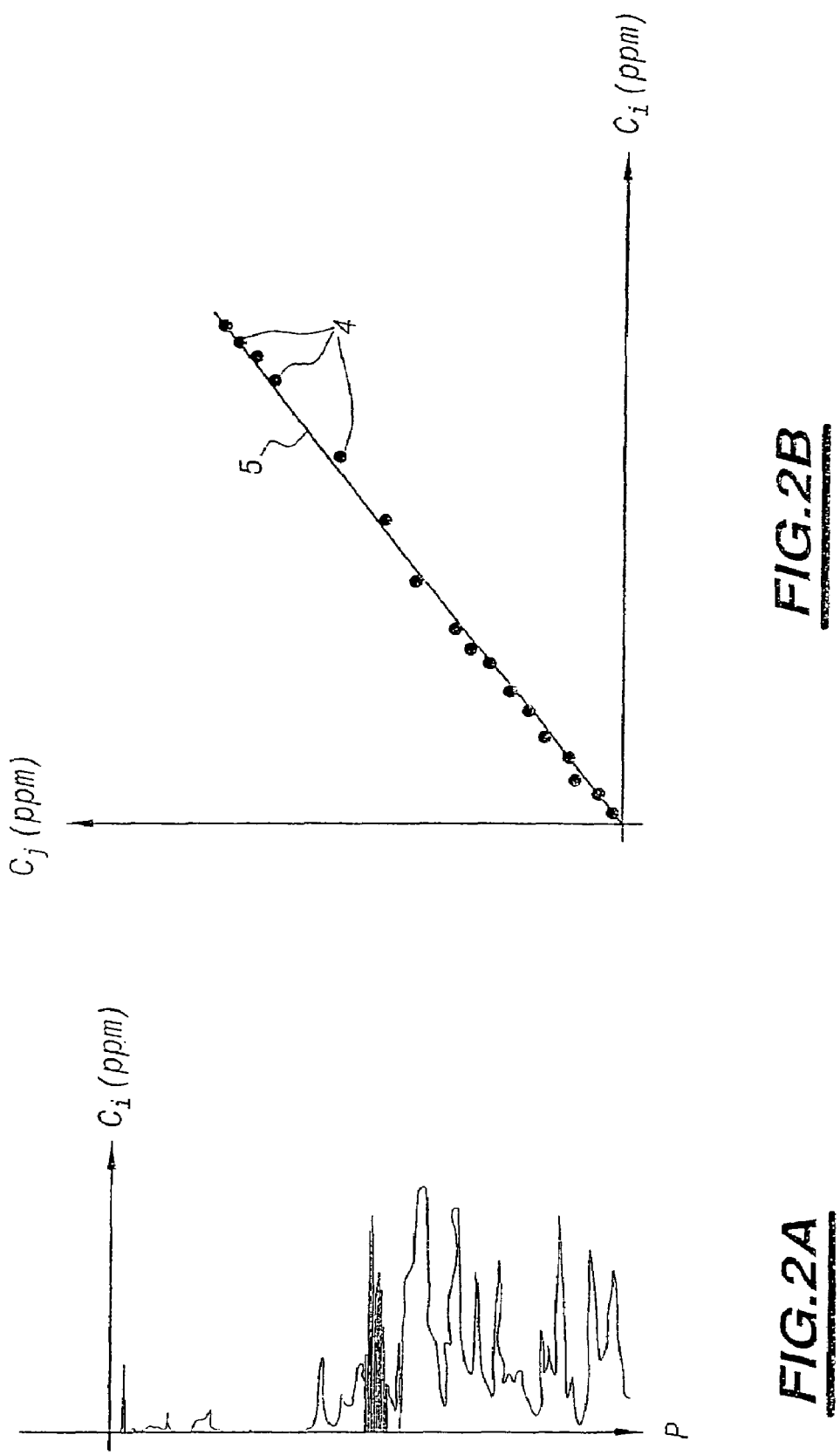
FIG. 2A illustrates the gaseous hydrocarbon content of the drilling muds in accordance with the depth.
FIG. 2B illustrates the content of a first gaseous hydrocarbon in accordance with the content of a second gaseous hydrocarbon for a depth range.

FIG. 2A illustrates the result of a measurement of this type for a given gaseous hydrocarbon $C_i$ in accordance with the depth P.

It should be noted that a high level of variability is found in the dynamics of this measurement, which makes the interpretation thereof complex.

According to a notable feature of the method according to the invention, the content 4 of a first and a second gaseous hydrocarbon $C_i$ and $C_j$ for a given depth range are marked on a chart, FIG. 2B, whose Cartesian co-ordinates represent the values in ppm of these contents, for these two gaseous hydrocarbons.

The measurement points are positioned substantially on a straight line or on a straight line segment 5 when the points originate from a homogeneous geological zone.

This straight line is characteristic of this geological zone.

Figure 3:
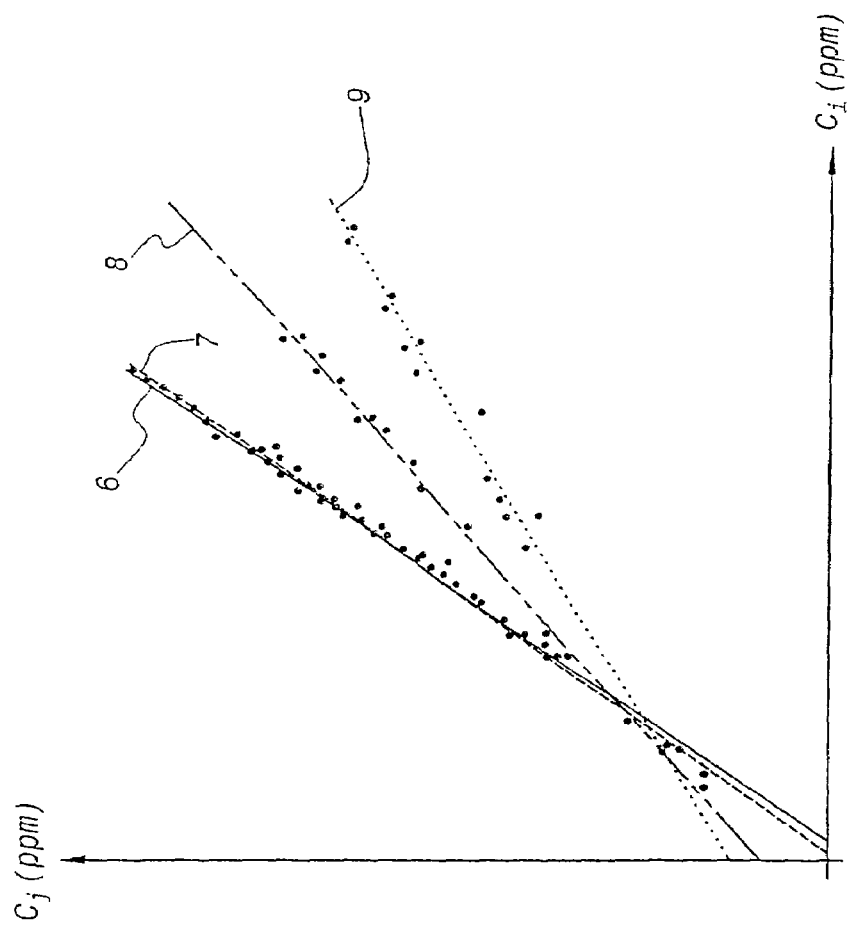
FIG. 3 illustrates the superimposition, for a plurality of depth ranges, of the content of a first hydrocarbon in accordance with the content of a second hydrocarbon.

According to another notable feature of the method according to the invention, the above graph is plotted for various depth ranges (6-9 FIG. 3).

Examination of FIG. 3 indicates that, for these four depth ranges illustrated, two of them (6 and 7) comprise straight lines which are almost superimposed. It is therefore possible to establish from this that these two depth ranges 6 and 7 correspond to geological strata having identical characteristics in terms of hydrocarbon content.

A diagram of FIG. 3 can also be produced for measurements corresponding to different wells. Two straight lines having the same inclination indicate that the depth ranges correspond to the same geological stratum. It is thus possible to determine the extent of an oil-rich field.

This analysis which is carried out on two gaseous hydrocarbons can, of course, be extended to other pairs of gaseous hydrocarbons in order to characterise the depth range more completely.

A person skilled in the art is then capable of selecting pairs of contents and therefore straight lines or segments of straight lines which are particularly representative of the hydrocarbon characteristics of a geological stratum and which thus define a signature thereof.

An analysis using other methods, numerical methods in particular, allows a correlation to be defined between this signature and the possibilities for hydrocarbon extraction. The signature thus allows an indicator to be defined which is particularly relevant, for explorers from the petroleum industry, to any type of oil-rich field in particular.

The invention claimed is:

1. A method for analyzing a hydrocarbon composition of homogeneous geological strata of a first drilling well through which a well drilling system extends, the drilling producing an effluent, the method comprising:

determining, at successive depths, contents of a plurality of gaseous hydrocarbons in the effluent;

establishing, at a substantially identical depth, a plurality of gaseous hydrocarbon content ratios, in pairs, for at least one first depth range, the establishing comprising plotting on a plot the content of a first of the gaseous hydrocarbons in the effluent at a given depth versus the content of a second of the gaseous hydrocarbons at the given depth for the successive depths in the at least one first depth range, each data point of the plot corresponding to one of the gaseous hydrocarbon content ratios;

selecting, within the plot, from the plurality of gaseous hydrocarbon content ratios, a sub-group of reference ratios constituting a signature that is representative of a gaseous hydrocarbon composition of the effluent in the at least one first depth range, the signature being formed by at least one straight line which is taken from a group of straight lines, each of the straight lines having a given inclination value representing the content of the first gaseous hydrocarbon as a function of the content of the second gaseous hydrocarbon; and comparing the signature with at least one reference signature in order to determine the hydrocarbon composition of the geological strata corresponding to the at least one first depth range.

2. A system for analyzing a hydrocarbon composition of homogeneous geological strata of a first drilling well through which a well drilling system extends, the drilling producing an effluent, the system comprising:

means for determining, at successive depths, contents of a plurality of gaseous hydrocarbons in the effluent;

means for establishing, at a substantially identical depth, a plurality of gaseous hydrocarbon content ratios, in pairs, for at least one first depth range, the means for establishing comprising means for plotting on a plot the content of a first of the gaseous hydrocarbons in the effluent at a given depth versus the content of a second of the gaseous hydrocarbons at the given depth for the successive depths in the at least one first depth range, each data point of the plot corresponding to one of the gaseous hydrocarbon content ratios;

means for selecting, within the plot, from the plurality of gaseous hydrocarbon content ratios, a sub-group of reference ratios constituting a signature that is representative of a gaseous hydrocarbon composition of the effluent in the at least one first depth range, the signature being formed by at least one straight line which is taken from a group of straight lines, each of the straight lines having a given inclination value representing the content of the first gaseous hydrocarbon as a function of the content of the second gaseous hydrocarbon; and means for comparing the signature with at least one reference signature in order to determine the hydrocarbon composition of the geological strata corresponding to the at least one first depth range.

3. A system according to claim 2, further comprising means for superimposing the plots corresponding to at least two homogeneous geological strata.

4. A computer readable storage medium having a computer program stored thereon for execution by a computer, the computer program for analyzing a hydrocarbon composition of homogeneous geological strata of a first drilling well through which a well drilling system extends, the drilling producing an effluent, the computer program causing the computer to execute a method comprising:

determining, at successive depths, contents of a plurality of gaseous hydrocarbons in the effluent;

establishing, at a substantially identical depth, a plurality of gaseous hydrocarbon content ratios, in pairs, for at least one first depth range, the establishing comprising plotting on a plot the content of a first of the gaseous hydrocarbons in the effluent at a given depth versus the content of a second of the gaseous hydrocarbons at the given depth for the successive depths in the at least one first depth range, each data point of the plot corresponding to one of the gaseous hydrocarbon content ratios;

selecting, within the plot, from the plurality of gaseous hydrocarbon content ratios, a sub-group of reference ratios constituting a signature that is representative of a gaseous hydrocarbon composition of the effluent in the at least one first depth range, the signature being formed by at least one straight line which is taken from a group of straight lines, each of the straight lines having a given inclination value representing the content of the first gaseous hydrocarbon as a function of the content of the second gaseous hydrocarbon; and comparing the signature with at least one reference signature in order to determine the hydrocarbon composition of the geological strata corresponding to the at least one first depth range.

5. A method according to claim 1, wherein the reference signature is formed by a second straight line representing the content of the first gaseous hydrocarbon as a function of the content of the second gaseous hydrocarbon for a second depth range distinct from the first depth range of the same first drilling well.

6. A method according to claim 5, wherein the first straight line almost superimposes the second straight line.

7. A method according to claim 1, wherein the reference signature is formed by a third straight line representing the content of the first gaseous hydrocarbon as a function of the second gaseous hydrocarbon in the effluent of a second drilling well distinct from the first drilling well.

8. A method according to claim 7, wherein the first straight line almost superimposes the second straight line.

* * * * *